United States Patent [19]

Nagao et al.

[11] 4,126,337
[45] Nov. 21, 1978

[54] SEPARATION-PREVENTIVE TYPE PIPE JOINT

[75] Inventors: Shozo Nagao; Yoshinobu O'Hashi; Yuichi Watanabe, all of Amagasaki, Japan

[73] Assignee: Kubota, Ltd., Osaka, Japan

[21] Appl. No.: 821,799

[22] Filed: Aug. 4, 1977

[51] Int. Cl.² ............................................. F16L 21/08
[52] U.S. Cl. ..................................... 285/231; 285/55; 285/321
[58] Field of Search ....................... 285/321, 230, 231

[56] References Cited

U.S. PATENT DOCUMENTS

| 2,877,732 | 3/1959 | Eaton | 285/321 X |
| 3,177,019 | 4/1965 | Osweiler | 285/288 |
| 3,712,648 | 1/1973 | Clifford | 285/321 |
| 3,741,591 | 6/1973 | Fessler et al. | 285/321 X |
| 3,899,183 | 8/1975 | Wild et al. | 285/231 X |

FOREIGN PATENT DOCUMENTS 668,574  2/1966  Belgium ................................. 285/321

Primary Examiner—Thomas F. Callaghan
Attorney, Agent, or Firm—Joseph W. Farley

[57] ABSTRACT

A slip-on type pipe joint wherein a ringlike seal packing is mounted in an annular recess formed in the inner peripheral surface of the socket end of one pipe and the spigot of another pipe is inserted, whereby the pipes are connected together. The pipe joint is characterized in that the inner peripheral surface of the socket is formed with an engagement projection projecting toward the axis of the pipe and disposed adjacent the inner side of the packing, a split lock ring axially engageable with the engagement projection is fitted in an annular groove formed in the outer peripheral surface of the spigot, and the opposed free ends of the split lock ring are joined together by a coupling piece placed on the lateral surface of the split lock ring disposed adjacent the front end side of the spigot to prevent the split lock ring from slipping off the annular groove.

10 Claims, 5 Drawing Figures

SEPARATION-PREVENTIVE TYPE PIPE JOINT

The present invention relates to a separation-preventive type pipe joint and more particularly it relates to a slip-on type pipe joint having separation-preventive means.

A slip-on type pipe joint, wherein a ringlike seal packing is mounted in an annular recess formed in the inner peripheral surface of the socket end of a pipe and the spigot of another pipe is inserted to connect the pipes together, has a desirable feature that is has high sealing performance due to its self-sealing function while it is simple in construction and has expansibility and flexibility.

When this slip-on type pipe joint is applied to a bend in a pipe line, however, there will be an extractive force acting on the pipe joint exerted by the fluid within the pipe striking the pipe wall at the bend. The conventional countermeasure thereagainst has been to cover such bend with a concrete block to counteract the extractive force by its weight, but the countermeasure has a disadvantage that the piping work involves much time and labor and the cost is high. When this type of pipe joint is applied to medium and large diameter pipes, the disadvantage comes to carry an important and decisive significance. Further, pipe joints provided with various means for preventing slipping-off have been proposed in order to enable pipe joints themselves to have a slipping-off-preventive function, but each pipe joint presents some problem or other. For example, it is complicated in construction and in execution of piping words, so that it is expensive, losing most all features of the slip-on type pipe joint; and when a high extractive force is exerted or flexing is added, a sufficient preventive force or sufficient reliability cannot be obtained. When applied particularly to medium and large diameter pipes having inner diameters of 600 mm or above, none of these pipe joints were found satisfactory in a way with respect to the above problems. In addition, the slipping-off-preventive function is necessary not only in the bends of a pipe line but also in a buried pipe line where the ground is soft and liable to suffer unequal subsidence or the like which will exert an extractive force on the pipe joint.

A principal object of the present invention is to provide a slip-on type pipe joint for medium and large diameter pipes which is simple in construction and which is highly reliable and is capable of positively preventing separation between the socket and the spigot even when a high extractive force acts thereon or flexing is added to such extractive force.

The invention provides a separation-preventive pipe joint comprising a spigot; a socket having a projection formed on the inner periphery of the open end thereof and adapted to be loosely fitted on the outer periphery of said spigot, an engagement groove disposed adjacent the inner side of said projection, and a packing seat disposed adjacent the inner side of said engagement groove; and a packing having a back-up portion having an engagement portion adapted to engage said engagement groove, and a seal portion adapted to be interposed in squeezed condition between said packing seat and the outer peripheral surface of said spigot, said pipe joint being characterized in that said socket is formed with a second projection disposed adjacent the inner side of said packing seat, a split lock ring engageable with said second projection axially of the pipe is fitted in an annular groove formed in the outer periphery of the front end of said spigot, and there is provided a coupling piece for joining the opposed free ends of said split lock ring.

According to a preferred embodiment of the invention, said coupling piece is applied to that lateral surface of said split lock ring at its opposed free ends which is disposed adjacent the front end of said spigot, and said coupling piece includes projections circumferentially engageable with mating engagement portions formed in the free ends of the split lock ring. Particularly, a coupling piece in which said mating engagement portions are in the form of holes formed in each free end of the split lock ring and said projections are in the form of pins, is simple in construction and facilitates coupling operation.

Another object of the invention is to provide a separation-preventive pipe joint which facilitates the execution of piping works, i.e., pipe connecting operation. More particularly, although the arrangement of the above described pipe joint does not complicate the pipe connecting operation, it has points to be further improved in connection with the operations of forming the portions to be engaged and of mounting the coupling piece at the site of connecting operation. Thus, the invention improves such points.

To this end, the invention provides a pipe joint in which said coupling piece is longitudinally bisected to provide two portions which are then connected together through distance adjusting means. Desirably, said distance adjusting means comprises a threaded bar having oppositely threaded portions at the opposite ends thereof.

In the case where a coupling piece whose length is adjustable is provided as described above, the projections can be easily aligned with holes preformed in the free ends of the split lock ring by adjusting the length of the coupling piece without the need of forming such holes at the operating site, thereby greatly facilitating the coupling piece mounting operation and hence the connecting operation.

Other numerous features and effects of the invention will be readily understood from the following description of preferred embodiments thereof given with reference to the accompanying drawings, in which.

Figure 1:
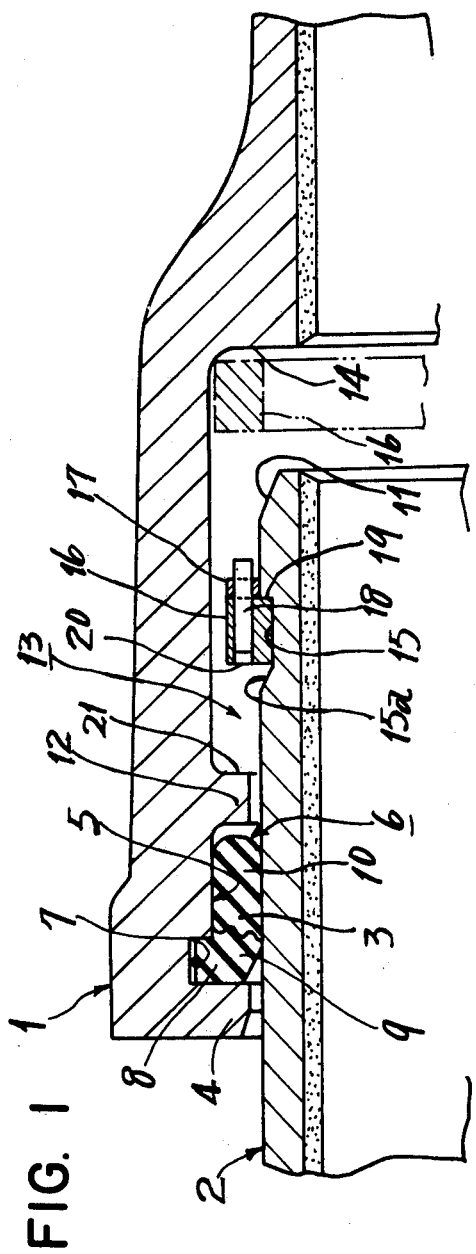
FIG. 1 is a longitudinal section of a separation-preventive type pipe joint according to a first embodiment of the invention.
Figure 2:
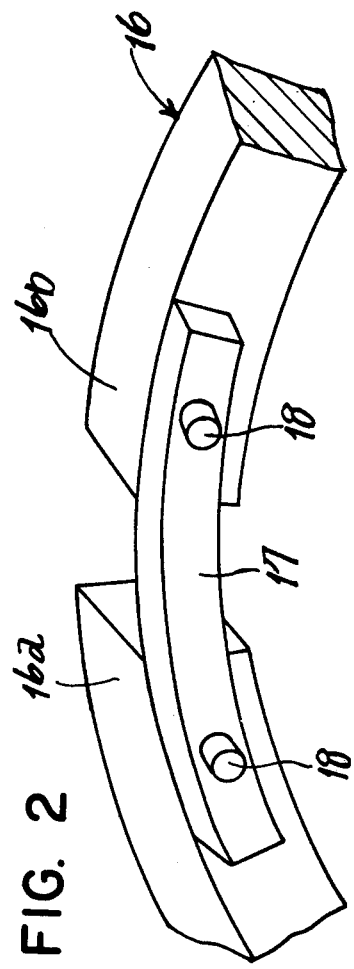
FIG. 2 is a perspective view showing the connected condition of the free ends of a split lock ring used in the pipe joint shown in FIG. 1.

Referring to FIGS. 1 and 2, a first embodiment will now be described.

Generally, a slip-on type pipe joint is composed of a socket 1, a spigot 2 and a ringlike packing 3, as shown in FIG. 1. The inner periphery of the open end of the socket 1 is formed with a projection 4 adapted to be loosely fitted on the outer periphery of the spigot 2 with a suitable clearance therebetween which allows easy insertion of the spigot 2. Formed adjacent the inner side of said projection is an annular recess with its peripheral surface providing a packing seat 5. There is defined a packing receiving annular space 6 which allows the packing to be interposed in squeezed condition between said packing seat 5 and the outer peripheral surface of the spigot 2. Formed between said projection 4 and said packing seat 5 is an engagement groove 7. In the illustrated example, said engagement groove 7 is in the form of an annular groove whose bottom surface diameter is greater than the diameter of said packing seat, but such engagement groove 7 may be formed by an annular projection on the end of the packing seat disposed adjacent the open end side of the socket. On the other hand, said packing comprises a back-up portion 9 formed with a fitting portion 8 adapted to be fitted in said engagement groove 7, and a seal portion 10 adapted to be fitted in said annular space 6 in squeezed condition so as to produce a seal surface pressure by its restoring force, said back-up portion and seal portion being integrally joined together. The inner peripheral surface of said packing 3 is in the form of a taper surface with its diameter gradually decreasing from the end edge of said back-up portion 9 toward the seal portion 10 to provide for the amount by which the seal portion 10 is squeezed. Further, the outer peripheral surface of the front end of the spigot 2 is also in the form of a taper surface 11 so that the spigot 2 may be smoothly inserted into the socket 1 having the packing 3 mounted therein while squeezing the seal portion 10.

In order to establish a pipe connection, the packing 3 is deformed and in this condition it is passed through the interior of the projection 4 on the open end of the socket and received in the annular recess in the socket 1 with the fitting portion 8 fitted in the engagement groove 7 and with the outer peripheral surface of the seal portion 10 contacted with the packing seat 5. Then, as described above, the spigot 2 is inserted into the socket 1 while squeezing the seal portion of the packing 3, whereby the socket 1 and the spigot 2 are connected together. It is the engagement between the fitting portion 8 and the engagement groove 7 that performs the function of holding the packing 3 in position against the axial force exerted on the packing during insertion of the spigot 2 and preventing it from being dragged by the spigot 2.

In addition, in the case of medium and large diameter pipes, it sometimes occurs that despite the engagement between the fitting portion 8 and the engagement groove 7, the packing 3 is dragged during insertion of said spigot 2, thus making it impossible to establish a firm connection. To prevent this, (a) the inner diameter of the packing seat 5 is smaller, desirably 1-6% smaller, than the outer diameter of the packing seal portion 10, (b) the depth of the engagement groove 7 is made equal to or greater than the height of the fitting portion 8, (c) the angle $\alpha$ between the lateral surface of the fitting portion 8 and the outer peripheral surface of the seal portion 10 of the packing 3 is made equal to or greater than the angle $\beta$ between the lateral surface of the annular groove 7 and the packing seat 5 in the socket, and (d) the maximum diameter end edge of the packing 3, i.e., the inner diameter of the end edge of the packing 3, i.e., the inner diameter of the end edge of the packing disposed adjacent the open side of the socket is made larger than the inner diameter of the projection 4. As a result, the packing 3 is circumferentially compressed when mounted in the socket 1 and hence a radial urging force against the packing seat 5 is produced. Further, there is no possibility of the seal portion 10 floating up from the packing seat 5 owing to the fitting portion 8 failing to be completely fitted in the engagement groove 7, nor is the possibility of said urging force being decreased when the restoring force of the packing acts to extract the fitting portion 8 from the annular groove 7 as in the case of $\alpha < \beta$, or of the packing 3 being dragged when the end edge of the back-up portion 9 of the packing 3 disposed adjacent the open end side of the socket is caught by the outer peripheral surface of the spigot 2. Therefore, even medium or large diameter pipes can be smoothly connected together.

In the pipe joint of such construction, in order to prevent the relative slipping-off of the socket 1 and spigot 2, a second projection 12 extending toward the axis of the socket is formed on the inner peripheral surface of the socket adjacent the inner side of the packing seat 5, i.e., the inner side of the place where the packing 3 is located. The inner diameter of the second projection 12 is larger than the inner diameter of said projection 4 to allow the spigot 2 to flex to some extent with respect to the socket 1. The region disposed adjacent the inner side of the second projection 12 is formed with a second wide annular recess 13, and 14 designates a radially extending step surface at the innermost end of said recess 13. On the other hand, formed in the outer peripheral surface of the spigot 2 near the front end thereof is a relatively shallow annular groove 15 in which a split lock ring 16 circumferentially cut at a place is mounted by its own radially contracting force. That is, the inner diameter of the split lock ring 16 in its natural state is smaller than the bottom surface diameter of the groove 15, and the split lock ring develops a radially contracting force when expanded at the time of mounting. The split lock ring 16 is generally made of ductile cast iron, steel or the like. The split lock ring 16, when fitted in the annular groove 15, has its opposed free ends 16a, 16b joined together by a coupling piece 17. More particularly, the coupling piece 17 extending across the opposed free ends 16a, 16b of the split lock ring is applied to that lateral surface 19 of the opposed free ends 16a, 16b which is disposed adjacent the inner side of the socket, and the coupling piece 17 and the opposed free ends 16a, 16b are joined together by fixing pins 18 extending through them. In addition, the coupling piece may have such fixing pins integral therewith. The lateral surface 20 of the split lock ring 16 disposed adjacent the open side of the socket is axially engageably opposed to the lateral surface 21 of the second projection 12 disposed adjacent the inner side of the socket. In addition, in the present invention, since a coupling piece 17 is used, it does not matter if the inner diameter of said split lock ring 16 is in its natural state is not smaller than the bottom surface diameter of the annular groove 15.

The split lock ring 16 is mounted in the following manner.

Prior to said connecting operation, the split lock ring 16 is fitted in the annular groove 15 in the spigot 2, the coupling piece 17 is applied to the split lock ring to abut on the opposed free ends thereof and holes through which fixing pins 18 are driven are formed. In addition, if the coupling piece is integral with the fixing pins, then a template or the like is used to form said holes. The split lock ring 16 is then removed from the spigot 2 and placed in the innermost part of the socket 1. The split lock ring is then radially expanded by using a suitable expanding jig or any other suitable means and retained in this expanded condition with a distance piece interposed between its opposed free ends, so that its inner diameter is larger than the outer diameter of the spigot 2, and in this condition it is placed in the innermost end of the socket 1, as shown in phantom lines in FIG. 1. Then, the packing is mounted as described above and the spigot 2 is inserted, whereupon the worker enters the pipe and he fits the split lock ring 16 on the outer peripheral surface of the front end of the spigot 2, removes said expanding jig or the distance piece, and pushes the split lock ring toward the annular groove 15. Thereupon, the split lock ring 16 is fitted in the annular groove 15 of itself since it has a radially contractive force. Thereafter, the worker applies the coupling piece 17 across the free ends 16a, 16b of the split lock ring and drives the fixing pins 18 into the previously formed holes or he mounts a fixing-pin-equipped coupling piece to complete the connection. On the other hand, in the case where the inner diameter of the split lock ring 16 is larger than the bottom surface diameter of the annular grooves 15, prior to the connecting operation the split lock ring 16 is fitted and is radially contracted by a suitable clamping jig. The setting of the coupling piece is then carried out with the split lock ring thus fitted in the annular groove. At the time of the connection operation, the split lock ring 16 is once stored in the socket 1 and the spigot 2 is inserted, whereupon the split lock ring 16 is fitted in the annular groove 15 by using the suitable clamping jig. In this condition, the coupling piece 17 is set in position, whereupon said clamping jig is removed.

In addition, in order to prevent the lateral surface of the annular groove 15 from catching the seal portion 10 of the packing 3 and damaging said seal portion 10, the lateral surface 15a of the annular groove 15 remote from the front end of the spigot 2 is tapered, the angle of inclination being approximately equal to that of the taper surface 11 of the front end of the spigot.

In the connected condition shown in FIG. 1, the force of restoration of the seal portion 10 of the packing 3 from its squeezed condition produces the necessary surface pressures acting between the packing 3 and the packing seat 5 and between the packing 3 and the outer peripheral surface of the spigot 2, and when the fluid pressure within the pipes is applied to the packing, such fluid pressure compresses the seal portion 10, so that a surface pressure equivalent to said fluid pressure is added to said surface pressure due to the restoring force of the seal portion and hence the total surface pressure acts on the seal surface. Therefore, a surface pressure higher than the fluid prescan always be automatically obtained without urging the packing from the outside against the fluid pressure. This self-seal effect assures water tightness or gas tightness at all times. On the other hand, it is the back-up portion 9 of the packing 3 itself that prevents the seal portion 10 of the packing 3 from being forced out through the clearance between the socket 1 and the spigot 2 as it is deformed under the fluid pressure within the pipe. The prevention of the whole packing 3 from being forced out by the fluid pressure within the pipe is effected by the projection 4 on the socket 1.

In the case where an extractive force above a certain value acts between the socket 1 and the spigot 2, the spigot 2 tends to slip off the socket 1, but the engagement between the lateral surface 20 of the split lock ring 16 and the lateral surface 21 of the second projection 12 prevents such slipping-off. In that case, the reaction to the slipping-off force received by the second projection 12 on the socket 1 is transmitted to the split lock ring 16 through the engagement surfaces 21, 20 and at the same time, it is transmitted to the spigot 2 through the engagement between the lateral surface 19 of the split lock ring 16 and the lateral surface of the annular groove 15 disposed adjacent the front end slide of the spigot. Now, in the transmission of a force from the split lock ring 16 to the spigot 2, if the force is circumferentially absolutely uniformly transmitted, the split lock ring will never come off the annular groove even if the former is simply fitted in the latter. In practice, however, there is some amount of scatter so that when a large amount of force acts or when the socket and spigot relatively flex, a biased force acts circumferentially on the split lock ring 16, entailing the danger of the split lock ring being relatively easily deformed and coming off the annular groove 15. Thus, the slipping-off-preventive function lacks reliability. However, joining the opposed free ends 16a, 16b of the split lock ring by the coupling piece 17 as described above prevents the relative circumferential movement of the opposed free ends. As a result, the condition in which the split lock ring 16 is fitted in the annular groove 15 is forcibly maintained, so that a highly reliable slipping-off-preventive function can be obtained. In addition, in order to prevent the split lock ring from coming off the annular groove, it would be contemplated to bolt the split lock ring to the spigot. As compared with such arrangement, the invention does not need to drill bolt holes, nor does it need to form threaded holes which require substantial time and labor. Thus, the man-hour requirement is small and there is no decrease in the strength of the annular groove caused by the presence of bolt holes.

Figure 3:
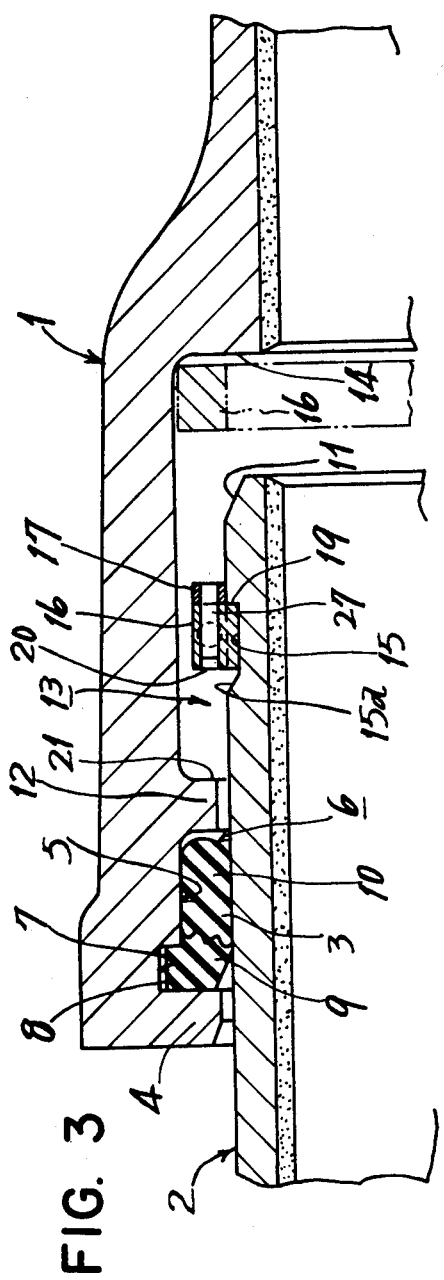
FIG. 3 is a longitudinal section showing a second embodiment of the invention.

A second embodiment adapted to further simplify the coupling piece mounting operation will now be described with reference to FIGS. 3-5. In addition, the parts which are substantially the same as those described in the first embodiment are given the same reference numerals and a description thereof is omitted.

Figure 4:
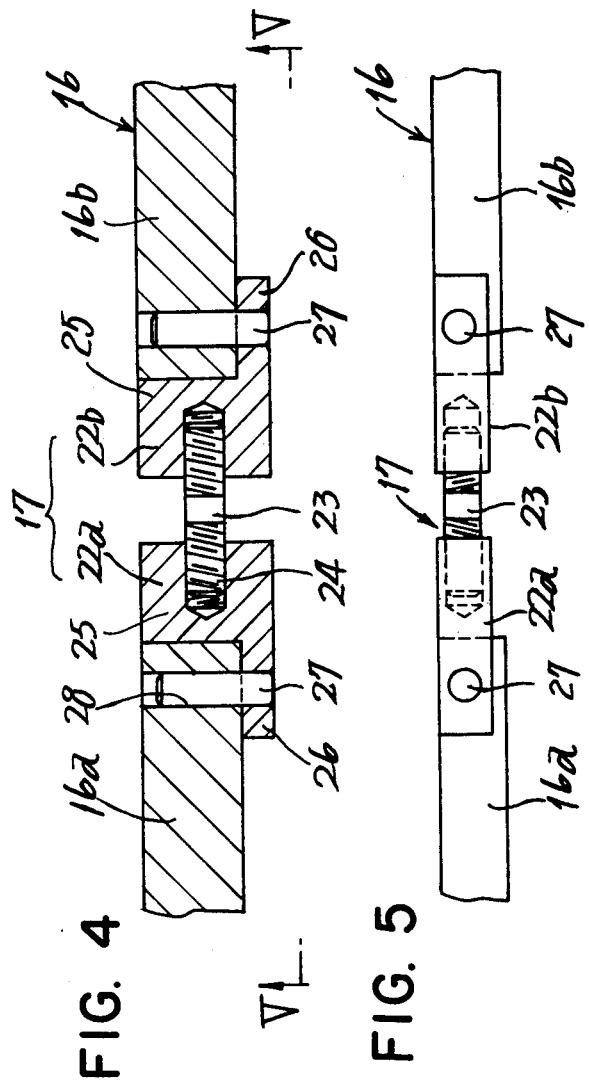
FIG. 4 is a cross-sectional view showing the connected condition of a split lock ring used in the pipe joint shown in FIG. 3.
Figure 5:
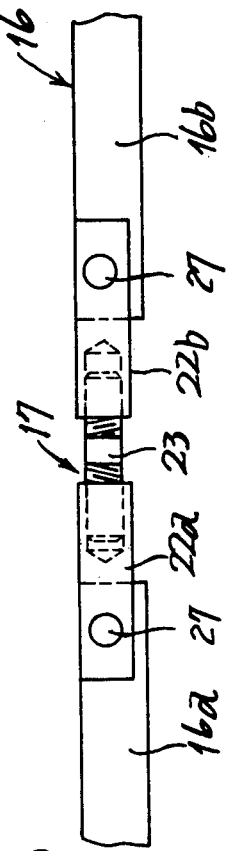
FIG. 5 is a view taken in the direction of the arrows V of FIG. 4.

A coupling piece 17 in this embodiment, as shown in FIGS. 4 and 5, comprises two parts 22a and 22b, bisected longitudinally, i.e., circumferentially of the split lock ring, and these two parts are connected together by a threaded bar 23 which is length adjusting means. The two parts 22a, and 22b will be hereinafter referred to as engagement pieces in that they are engaged with and fixed to the opposed free ends 16a, 16b of the split lock ring 16. Each engagement piece 22a or 22b is L-shaped, comprising a base portion 25 contacted with the front end surface of a free end 16a and 16b of the split lock ring 16 and having a threaded hole 24 for receiving said threaded bar 23, and a projection 26 contacted with the lateral surface adjoining said front end surface and disposed adjacent the front end side of the spigot, said projection 26 having an engagement pin 27 vertically projecting from the surface which contacts said lateral surface. The engagement pins 27 are fitted in and engaged with engagement holes 28 formed in the free ends 16a, 16b of the split lock ring axially of the pipe, whereby the engagement pieces 22a and 22b are engaged with and fixed to the free ends 16a, 16b of the split lock ring. In addition, the threaded bar 23 has been shown as having oppositely threaded portions on the opposite sides of the middle region to allow fine adjustments finer than the thread pitch. However, this is not absolutely necessary, even if one and the same thread may be cut throughout the length, there will be no substantial problem; rather, the production cost is low. Further, the engagement pins 27 may be integral with or integrally secured to the engagement pieces 22a and 22b. Alternatively, they may be driven when the split lock ring and the engagement pieces 22a, 22b are to be connected together.

The mounting of the split lock ring 16 on the spigot 2 is carried out in the following manner.

Prior to establishing a connection between the socket 1 and the spigot 2, the split lock ring 16 is fitted in the annular groove 15 in the spigot 2 and the length of the coupling piece 17 is adjusted by making use of the threaded bar 23 so that the base portions 25 of the engagement pieces 22a and 22b may be fitted between the front end surfaces of the free ends 16a, 16b. More particularly, the threaded bar 23 is suitably rotated with respect to the engagement pieces 22a and 22b or if the threaded bar 23 has a thread cut in the same direction throughout the length, one or both of the engagement pieces 22a and 22b are rotated in increments of one revolution with respect to the threaded bar 23. If the adjustment is found successful, the engagement pins 27 can be fitted in the engagement holes 28 by inserting the base portions 25 of the engagement pieces between the free ends 16a, 16b of the split lock ring, whereby the split lock ring 16 and the engagement pieces 22a, 22b (i.e., the coupling piece 17) can be connected together. Then, the split lock ring 16 is removed from the spigot 2 and, as in the first embodiment, it is placed at the innermost end of the socket 1, as shown in phantom lines in FIG. 3. The packing 3 is then mounted on the socket 1 and the spigot 2 is inserted, whereupon the worker enters the pipe and, as described above, he fits the split lock ring 16 in the annular groove 15 and installs the adjusted coupling piece 17 between the free ends 16a, 16b of the split lock ring.

According to this embodiment, in the operation for mounting the lock ring at the connecting site, it is only necessary to adjust the length of the coupling piece by making use of the threaded bar which is adjusting means and, within the pipe, to mount the thus adjusted coupling piece between the opposed free ends of the split lock ring. Therefore, the connecting operation in the job site, which is relatively narrow, is easy.

We claim:

1. In a pipe joint comprising a spigot; a socket having a projection formed on the inner periphery of the open end thereof and adapted to be loosely fitted on the outer periphery of said spigot, an engagement groove disposed adjacent the inner side of said projection, and a packing seat formed adjacent the inner side of said engagement groove; and a packing having a back-up portion having a fitting portion adapted to be fitted in said engagement groove, and a seal portion adapted to be interposed in squeezed condition between said packing seat and the outer peripheral surface of the spigot, the improvement comprising:

a second projection formed adjacent the inner side of said packing seat;

a second annular recess formed on the socket and extending axially inwardly from said second projection;

an annular groove formed in the outer periphery of the front end of said spigot and located axially inwardly of the second projection in the condition of connection of the socket and spigot;

a split lock ring placeable in the innermost part of said second annular recess prior to the insertion of the spigot in the socket, said split lock ring being movable, in said condition of connection of the socket and spigot, through the annular space between the inner peripheral surface of said second annular recess and the outer peripheral surface of the spigot into fitted relation with said annular groove, said split lock ring being engageable with said second projection axially of the pipe; and, a coupling piece for joining the opposed free ends of said split lock ring so as to prevent said split lock ring from radially expanding from its condition of being fitted in said annular groove, said coupling piece being engageable with said opposed free ends from within the socket and through said annular space.

2. A pipe joint as set forth in claim 1, wherein said coupling piece is applied to the lateral surface of the opposed free ends of said split lock ring disposed adjacent the front end side of the spigot, and includes projections adapted to be circumferentially engaged with mating engagement portions formed in said opposed free ends.

3. A pipe joint as set forth in claim 2, wherein said mating engagement portions are in the form of holes formed in the free ends of the split lock ring axially of the pipe and said projections are in the form of pins projecting from the coupling piece for insertion into said holes.

4. A pipe joint as set forth in claim 3, wherein said pins are integral with said coupling piece.

5. A pipe joint as set forth in claim 3, wherein said pins are separate from said coupling piece and are inserted into the holes in the split lock ring through holes formed in said coupling piece.

6. A pipe joint as set forth in claim 2, wherein said coupling piece is longitudinally bisected and hence it consists of two parts, which are joined together by distance adjusting means.

7. A pipe joint as set forth in claim 6, wherein said distance adjusting means comprises a threaded bar adapted to have its opposite end portions screwed into said two parts.

8. A pipe joint as set forth in claim 7, wherein the threads on the opposite end portions of said threaded bar are mutually opposite handed.

9. A pipe joint as set forth in claim 6, wherein the projections projecting from said parts are pins while the mating engagement portions of the free ends of the split lock ring are holes extending axially of the pipe.

10. A pipe joint as set forth in claim 6, wherein said parts are each L-shaped having surfaces for contact with the front end surface of each free end of the split lock ring and with the lateral surface of each free end of the split lock ring disposed adjacent the front end side of the spigot.

* * * * *

UNITED STATES PATENT AND TRADEMARK OFFICE
CERTIFICATE OF CORRECTION

PATENT NO. : 4,126,337
DATED : November 21, 1978
INVENTOR(S) : SHOZO NAGAO ET AL It is certified that error appears in the above-identified patent and that said Letters Patent are hereby corrected as shown below:

Column 1, line 11, "is" should read -- it --;

line 31, "words" should read -- works --;

Column 5, line 22, "connection" should read -- connecting --;

line 48, "prescan" should read -- pressure can --;

Column 6, line 4, "slide" should read -- side --;

Column 7, line 57 (Claim 1), "on" should read -- in --.

Signed and Sealed this

Twenty-ninth Day of May 1979

[SEAL]

Attest:

RUTH C. MASON
*Attesting Officer*

DONALD W. BANNER
*Commissioner of Patents and Trademarks*